United States Patent [19]

Hashimoto

[11] 4,359,278
[45] Nov. 16, 1982

[54] TRIAXIAL FOCAL PLANE SHUTTER

[75] Inventor: Akihiko Hashimoto, Hachioji, Japan

[73] Assignee: Olympus Optical Company, Ltd., Japan

[21] Appl. No.: 316,525

[22] Filed: Oct. 29, 1981

[30] Foreign Application Priority Data

Dec. 2, 1980 [JP] Japan ............................. 55-170757
Dec. 2, 1980 [JP] Japan ............................. 55-170758

[51] Int. Cl.³ ............................................. G03B 9/32
[52] U.S. Cl. ................................................. 354/244
[58] Field of Search ............................. 354/241-244

[56] References Cited

U.S. PATENT DOCUMENTS

4,272,171 6/1981 Hashimoto et al. .
4,298,264 11/1981 Ishii ................................ 354/244

Primary Examiner—John Gonzales
Attorney, Agent, or Firm—Ostrolenk, Faber, Gerb & Soffen

[57] ABSTRACT

A triaxial focal plane shutter includes a second blind winding drum which is rotatably supported by a pair of support members disposed above and below it. A first blind winding shaft extends through the second blind winding drum and the pair of support members, and fixedly carries a pair of first blind winding pulleys on its upper and lower ends, thereby allowing an independent rotation of the second blind winding drum and the first blind winding pulleys.

7 Claims, 16 Drawing Figures

TRIAXIAL FOCAL PLANE SHUTTER

BACKGROUND OF THE INVENTION

The invention relates to a triaxial focal plane shutter, and more particularly, to a triaxial focal plane shutter utilizing cloth blinds in which first blind winding pulleys and a second blind winding drum are disposed in substantially coaxial manner.

As is known, triaxial focal plane shutters utilizing cloth blinds have been used extensively in single lens reflex cameras in the past. However, at the present time, the general trend is directed toward the use of four axis focal plane shutters utilizing cloth blinds, and only a very few cameras utilize a triaxial arrangement. This is because of the specific construction of conventional triaxial focal plane shutter in which a first blind winding pulley and a second blind winding drum are coaxially disposed on a single support shaft so as to be independently rotatable and in which during a shutter winding operation, they are rotated substantially integrally, which resulted in a complex and bulky arrangement for the support mechanism and the coupling mechanism associated with the first blind winding pulley and the second blind winding drum. Because of the complexity of the coupling mechanism, it is difficult to provide a bearing mounted on a stationary member which provides an independent support for the second blind winding drum. Rather, the drum must be indirectly mounted on a first blind winding shaft on which the first blind winding pulley is mounted. As a result, to form the coupling mechanism, a number of gears and clutches must be disposed around the first blind winding pulley and the second blind winding drum which are disposed in coaxial manner. This results in an increased size of the focal plane shutter itself, and the complex coupling mechanism is likely to cause a failure. The failure is particularly likely when either the first or the second blind is stopped in the course of its running.

A gear contained in the coupling mechanism which couples the first blind winding pulley and the second blind winding drum is partly maintained in coupled relationship with the first blind winding pulley and the second blind winding drum and also rotates together as the first and the second blind run, with the result that the inertia of the gear causes a failure to produce a stabilized running speed of the blind.

A lack of stability in the running speed of the blind during the operation of the conventional triaxial focal plane shutter is also caused by the inertia of transmission gears or rollers connected to a film winding mechanism or a shutter speed presetting dial and which are also operated at the same time as the first blind winding pulley or the second blind winding drum.

SUMMARY OF THE INVENTION

It is an object of the present invention to eliminate the above disadvantages of the prior art by providing a triaxial focal plane shutter in which a second blind winding drum is supported singly by bearings carried by support members and a first blind winding shaft is disposed to extend through the second blind winding drum and the support member and has first blind winding pulleys mounted thereon on its upper and lower ends.

It is another object of the invention to provide a triaxial focal plane shutter in which a coupling mechanism between a second blind winding drum and first blind winding pulleys is disposed inside the drum.

In accordance with the invention, the triaxial focal plane shutter can be reduced in size as compared with the prior art arrangement, and hence can be easily incorporated into a single lens reflex camera. In particular, as compared with a four axis focal plane shutter, a first blind winding drum is replaced by first blind winding pulleys which are disposed coaxially with a second blind winding drum, so that a drive motor may be disposed where the first blind winding drum has been disposed, advantageously facilitating the incorporation of the arrangement into a motor driven camera.

Since the first blind winding pulleys and the second blind winding drum are independently supported by bearings mounted on the support members, it is possible to dispose them in an eccentric manner for enhancing the stability of the running speed of the blind.

According to another aspect of the invention, the coupling mechanism between the second blind winding drum and the first blind winding pulleys can be disposed inside the second blind winding drum, advantageously reducing the overall size of the shutter. The coupling mechanism disposed within the second blind winding drum is small in size and simple in construction, reducing the occurrence of failures while providing reliable operation.

As a result of the arrangement that the coupling mechanism between the second blind winding drum and the first blind winding pulleys is disposed inside the second blind winding drum, a gear which is connected to the winding shaft of the shutter may be formed by one of gears which are used to transmit a drive for winding the shutter. The gear is arranged to be disconnected during a shutter operation, and hence it is a simple matter to implement a so-called independent type focal plane shutter in which a shutter operation takes place while the shutter is disconnected from transmission gears or rollers. In this manner, the arrangement lends itself to its use in a motor driven camera while providing an enhanced stability in the running speed of the shutter blind.

DESCRIPTION OF PREFERRED EMBODIMENT

Figure 1:
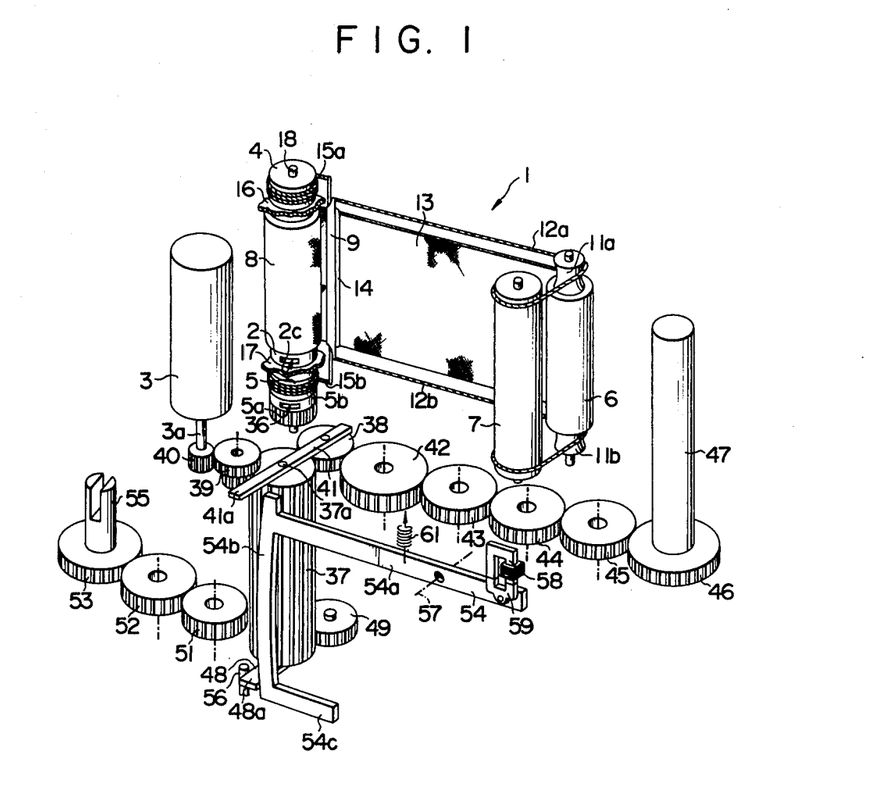
FIG. 1 is a perspective view of a triaxial focal plane shutter according to one embodiment of the invention.

Referring to FIG. 1, there is shown a triaxial focal plane shutter 1 according to one embodiment of the present invention. The shutter 1 essentially comprises a second blind winding drum 2 located forwardly of and on the left-hand side of an image field of a camera as the camera is viewed from the front side thereof; a pair of first blind winding pulleys 4, 5 disposed in approximately a coaxial relationship with the drum 2 on the upper and the lower side thereof (the relationship is described in more detail with reference to FIG. 4, below); a first blind take-up drum 6 disposed in opposing relationship with the second blind winding drum 2 on the opposite or right-hand side of the image field; a second blind take-up drum 7 disposed forwardly of the first blind take-up drum 6; a second shutter blind 8 having its left-hand edge secured to the second blind winding drum 2 and having a length thereof disposed thereon; an edge piece 9 secured to the right-hand edge of the second blind 8; an upper string 12a and a lower string 12b having their one end anchored to the upper and the lower end of the edge piece 9 and extending around a pair of pulleys 11a, 2b which are disposed above and below the first blind take-up drum 6 to have their other end anchored to the second blind take-up drum 7 for pulleying the second blind; a first shutter blind 13 having its right-hand edge anchored to the first blind take-up drum 6 and having a length thereof disposed thereon; an edge piece 14 anchored to the left-hand edge of the first blind 13; and an upper and a lower string 15a, 15b having their one end anchored to the upper and the lower end of the edge piece 14 and disposed around the first blind winding pulleys 4, 5 and anchored thereto for pulling the first blind.

Figure 2:
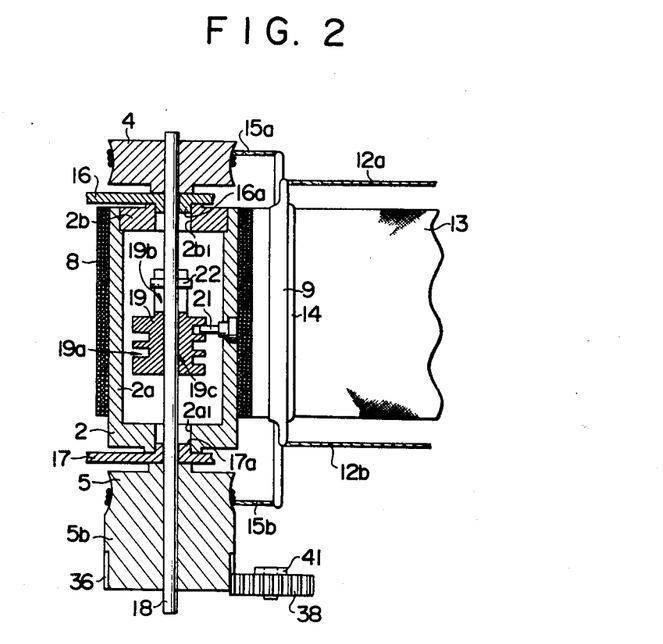
FIG. 2 is an enlarged longitudinal section of a second blind winding drum used in the triaxial focal plane shutter of FIG. 1.

As shown in FIG. 2, the second blind winding drum 2 comprises a hollow cylindrical member 2a having a bottom at its one end and which is open at its other end, to which a lid member 2b is secured to provide a hollow interior. The bottom of the cylindrical member as well as the lid member are centrally formed with bearings 2a1, 2b1, respectively, into which are fitted bearing dowels 16a, 17a formed on an upper and a lower support plate 16, 17, both secured to a stationary member, not shown, in opposing relationship to each other, whereby the drum 2 is rotatably mounted. The first blind winding pulleys 4, 5 are fixedly mounted on the upper and the lower end of a first blind winding shaft 18 which extends through the bearing dowels 16a, 17a and through the interior of the second blind winding drum 2 to the outer side of the support plates 16, 17.

Figure 3:
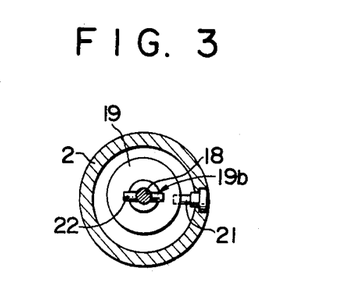
FIG. 3 is a horizontal section of a second blind winding drum shown in FIG. 2.
Figure 4:
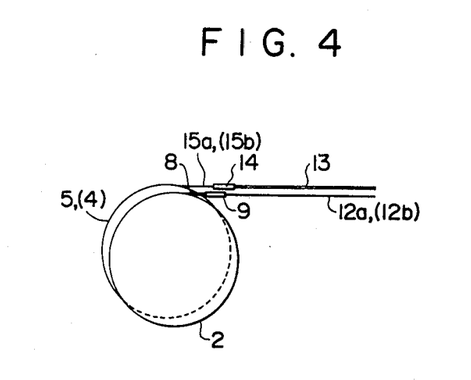
FIG. 4 is a diagrammatic plan view illustrating the eccentric relationship between the second blind winding drum and the first blind winding pulleys in the triaxial focal plane shutter shown in FIG. 1.
Figure 5:
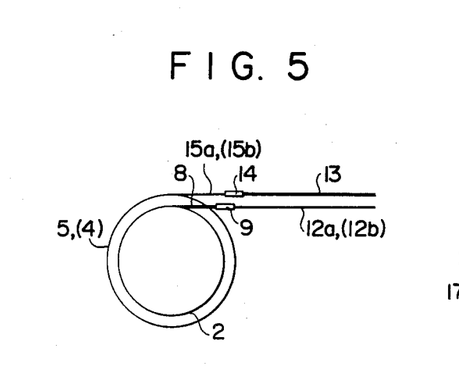
FIG. 5 is a diagrammatic plan view illustrating the relative position of the second blind winding drum and the first blind winding pulleys in a conventional triaxial focal plane shutter.

As shown in FIG. 3, the first blind winding shaft 18 is disposed at an eccentric position with respect to the central axis of the second blind winding drum 2, and is offset slightly to the left and rearwardly, as viewed from the front side of the camera. As a result, the first blind winding pulleys 4, 5 are slightly eccentric with respect to the second blind winding drum 2, as illustrated in FIG. 4. The purpose of disposing the first blind winding pulleys 4, 5 eccentrically with respect to the second blind winding drum 2 is to eliminate various difficulties experienced with a conventional focal plane shutter in which the first blind winding pulleys and the second blind winding drum are disposed in coaxial manner. Specifically, in a focal plane shutter, it is necessary that the edge pieces 9, 14 be disposed in partly overlapping relationship when the camera is not in use, in particular, during a shutter charging operation, in order to assure the integrity of light shielding effect. In a conventional focal plane shutter, a second blind winding drum (as shown at 2) which is coaxially disposed with respect to first blind winding pulleys (as shown at 4 and 5) is formed to have a reduced diameter than the pulleys, as illustrated in FIG. 5, and the second blind winding drum (2) is rotated with a speed which is greater than the speed of rotation of the first blind winding pulleys (4, 5), thus attaining the overlapping relationship mentioned above. However, when such arrangement is employed, there occurs a number of difficulties which make it impossible to provide an increased distance to allow the first and the second shutter blinds 13, 8 to traverse over such distance before they reach an image field A defined for exposure (see FIGS. 8(A) to (D)). As a result, a satisfactory stability cannot be achieved in the running speed of the blind. Additionally the differential rotational speed between the first blind winding pulleys 4, 5 and the second blind winding drum 2 require a complex winding mechanism, and the differential diameters of the pulleys 4, 5 and the drum 2 made it difficult to provide an adjustment for the relative inertia of the pulleys 4, 5 and the drum 2.

In the focal plane shutter of the invention, these difficulties are eliminated by utilizing the first blind winding pulleys 4, 5 and the second blind winding drum 2 which are of an equal diameter and which are disposed eccentrically with respect to each other. As a result of such design, the location of the edge pieces 9, 14 can be brought to a point closer to the pulleys 4, 5 and the drum 2 when the shutter is being charged, so that there can be provided an increased distance through which the first blind 13 and the second blind 8 run before they reach the image field, thus allowing a stabilization of the running speed of the blinds. Since both the pulleys 4, 5 and the drum 2 may be rotated at the same speed, the associated winding mechanism may be greatly simplified. In addition the use of, an equal diameter for the pulleys 4, 5 and the drum 2 facilitates an adjustment for providing a comparable inertia.

Figure 6:
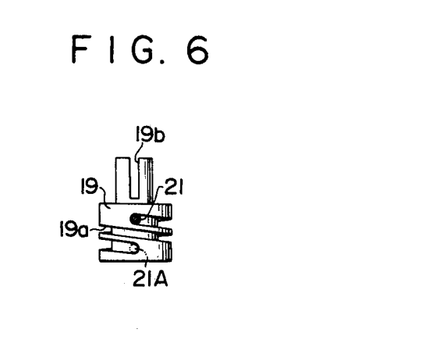
FIG. 6 is a side elevation of a guide member disposed inside the second blind winding drum shown in FIG. 2.

Referring to FIG. 2, a guide member 19 is disposed inside the second blind winding drum 2, and is centrally formed with a through-opening 19c through which the first blind winding shaft 18 extends. Referring to FIG. 6, the guide member 19 is a two-part member including a lower cylindrical portion of a larger diameter, the peripheral surface of which is formed with a helical guide groove 19a, and an upper cylindrical portion of a reduced diameter having an anti-rotation slit 19b formed therein. A radially inwardly extending guide pin 21 (FIG. 2) is fixedly mounted on the inner surface of the second blind winding drum 2 and has its free end fitted into the guide groove 19a, thereby constraining a vertical position of the guide member 19. An anti-rotation pin 22 is fixedly mounted on the first blind winding shaft 18 so as to be orthogonal to the axis thereof, and is fitted into the anti-rotation groove 19b, thereby preventing a rotation of the guide member 19 relative to the first blind winding shaft 18. The combination of the guide member 19 and the guide pin 21 forms a coupling mechanism which integrally couples, in the sense of rotation, the first blind winding pulleys 4, 5 and the second blind winding drum 2 during a shutter charging operation. When the first shutter blind 13 is to run, the guide pin 21 remains stationary while the guide member 19 is allowed to rotate under the guiding action of the pin 21 which fits in the guide groove 19a, until the point of engagement of the pin 21 with the guide groove 19a moves from the position shown in solid line in FIG. 6 to position 21A shown in dotted lines, thus allowing only the first blind winding pulleys 4, 5 to rotate. During a shutter charging operation, the guide pin 21 has already returned to its most counter-clockwise position shown in solid line in FIG. 6, within the guide groove 19a, so that as the first blind winding shaft 18 rotates for the purpose of a winding operation, the left-hand edge of the groove 19a bears against the pin 21, thus causing an integral rotation of the first blind winding shaft 18 and the second blind winding drum 2. Consequently, the second blind 8 is wound up by the drum 2 at the same time as the first blind 13 is wound up by the pulleys 4, 5.

Figure 7:
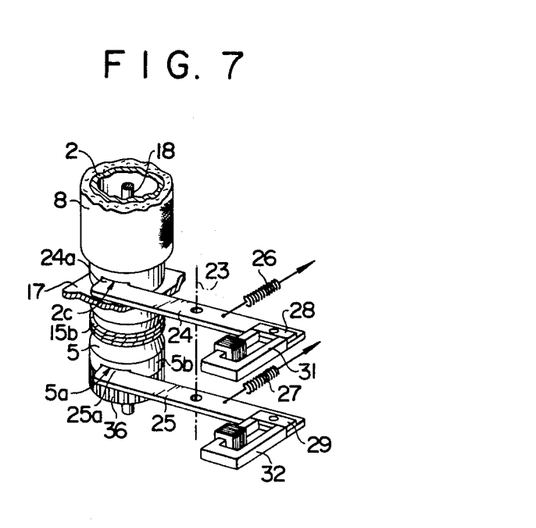
FIG. 7 is a perspective view essentially illustrating detent means associated with the first blind and the second blind in the triaxial focal plane shutter shown in FIG. 1.

A solid cylindrical member 5b is located below and integral with the lower first blind winding pulley 5, and the lower end portion of the second blind winding drum 2 and the cylindrical member 5b are formed with locking holes 2c, 5a, respectively, which are used to lock both the drum 2 and the pulleys 4, 5 at their wound positions. As shown in FIG. 7, these locking holes 2c, 5a are engaged by detent pawls 24a, 25a, respectively, which are formed on one end of a pair of detent levers 24, 25, both of which are coaxially mounted on a support shaft 23, as shown in FIG. 7. The other end of each of the detent levers 24, 25 is engaged by one end of a coiled tension spring 26 or 27, respectively, whereby the levers 24, 25 are urged to rotate counter-clockwise about the support shaft 23. However, the resulting rotation of the levers 24, 25 is normally limited by the fact that armatures 28, 29 which are mounted on the other end of the respective levers 24, 25 are held attracted by release electromagnets 31, 32, respectively. In unlock positions shown in FIGS. 8(B) and (D), part of the detent levers 24, 25 bears against stop pins, not shown, thereby limiting their rotation about the shaft 23 under the resilience of the springs 27, 26.

Figure 8A:
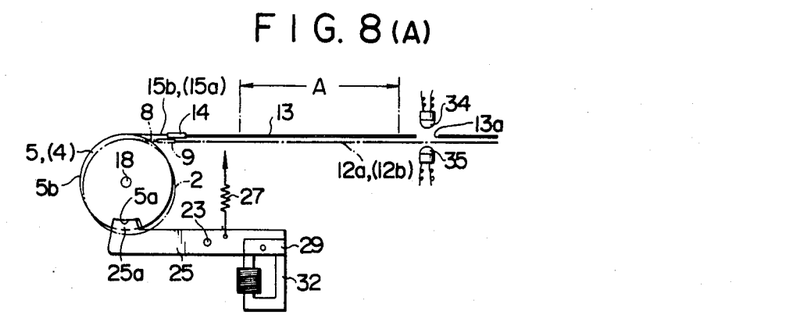
FIGS. 8(A) to (D) are schematic plan views illustrating the manner of operation of the triaxial focal plane shutter shown in FIG. 1.
Figure 9:
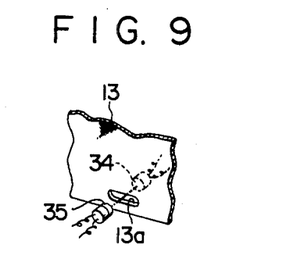
FIG. 9 is a perspective view illustrating shutter operation detecting means which is disposed in the triaxial focal plane shutter of FIG. 1.

As shown in FIG. 8(A), the first blind 13 extends in taut condition between the first blind winding pulleys 4, 5 and the first blind take-up drum 6 (see FIG. 1), along a running path, along which a light emitting element 34, and a light receiving element 35 are located opposite to each other on the opposite sides of the path in a region displaced out of the image field A. The combination of elements 34, 35 forms means for detecting a shutter operation. Element 34 may comprise a light emitting diode, for example, while element 35 may comprise silicon blue cell, for example. The purpose of providing such special means for detecting a shutter operation is to permit a shutter charging operation independently from a film winding operation in the focal plane shutter of the invention. In a camera employing a film winding mechanism of a conventional sprocket driven type, a sprocket rotates through one revolution to feed the film exactly the length corresponding to a single frame during a film winding operation. At the same time, the shutter is charged in interlocked relationship with the rotation of such sprocket. Consequently, the rotational position of the sprocket provides an indication whether the first and the second shutter blinds 13, 8 have been wound up to given positions, and there is no need for any special means to provide such information. However, in the focal plane shutter of the present invention in which a shutter charging operation takes place independently from a film winding operation, there is no means available in connection with a film winding operation which indicates the completion of a shutter charging operation. Consequently, foregoing means for detecting the completion of a shutter charging operation is separately provided. Upon completion of a shutter charging operation, both elements 34, 35 are aligned with a detection hole 13a formed in the lower edge of the first shutter blind 13 toward its right-hand end, as indicated in FIGS. 8(A) and 9, thus allowing the completion of a shutter charging operation to be detected by an increased output from the photoelectric transducer element 35.

In addition to detecting the completion of a shutter charging operation, the combination of the elements 34, 35 is also effective to detect the completion of running of the first or the second blind 13, 8, thus controlling the energization of the release electromagnets 31, 32 and serving in place of synchro contacts.

Figure 10:
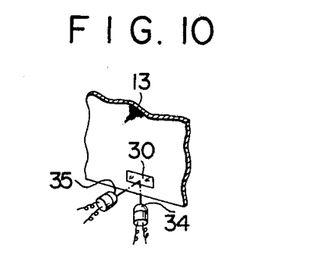
FIG. 10 is a perspective view of another form of shutter operation detecting means, illustrating an alternative arrangement to that shown in FIG. 9.

FIG. 10 shows an alternative arrangement in which the both elements 34, 35 are located on the same side of the blind running path so as to detect a light reflection from a reflecting member 30 which is applied to the lower edge of the first blind 13 toward its right-hand end, thus similarly detecting the completion of a shutter charging operation.

A shutter charging, winding gear 36 is integrally formed with the lower portion of the cylindrical member 5b which is in turn integral with the first blind winding pulley 5, as shown in FIG. 1. The winding gear 36 is located opposite to a planet gear 38 which in turn meshes with the upper portion of an axially elongate sun gear 37. The sun gear 37 is coupled through a reduction gear 39 with an output gear 40 which is mounted on an output shaft of a cylindrical drive motor 3 which is elongate in a direction parallel to the drum 2 and which is located forwardly of the latter. The planet gear 38 is arranged to be coupled with the sun gear 37 by means of clutch plate 41. In addition to its meshing engagement with the shutter charging gear 36, the planet gear 38 is also arranged to be engageable with a first stage gear 42 of a film winding gear train 42 to 46 at appropriate time. Thus, the planet gear 38 selectively revolves about the sun gear 37 in accordance with the direction of rotation of the latter so as to be brought into meshing engagement with either winding gear 36 or gear 42. It will be noted that the first stage gear 42 is connected through a plurality of intermediate gears 43 to 45 with a film winding gear 46 which is integrally formed on the lower end of a film take-up spool shaft 47, which is located to the right of the first blind take-up drum 6 and the second blind take-up drum 7.

A film rewind planet gear 49 is disposed adjacent to the lower portion of the sun gear 37 and is engageable with the latter by operating a film rewind clutch plate 48. The planet gear 49 is disposed at an elevation which is aligned with a first stage gear 51 of a film rewind gear train 51 to 53. Whenever the sun gear 37 rotates in the counter-clockwise direction and a switching member 54, to be described later, retracts from its position where it constrains a movement of the clutch plate 48, the planet gear 49 revolves around the sun gear 37 into meshing engagement with the gear 51. The first stage gear 51 is coupled through an intermediate gear 52 to a film rewind gear 53 which is integrally formed on the lower end of a film rewind shaft 55 which is disposed to the left of the second blind winding drum 2 and the drive motor 3.

Intermediate their lengths, the clutch plates 41 and 48 are pivotally mounted on support pins 37a which are secured to the upper and the lower end face of the sun gear 37. On the side remote from their arms on which the planet gears 38, 49 are mounted, these clutch plates 48 extend beyond the diameter of the sun gear 37, with their free end forming engaging pieces 41a, 48a, located opposite to the switching member 54 which is used to establish a film rewind operation. The lower clutch plate 48 is arranged so that the left-hand side of the engaging piece 48a bears against a stop pin 56, whereby its rotation in the clockwise direction is limited.

Figure 13:
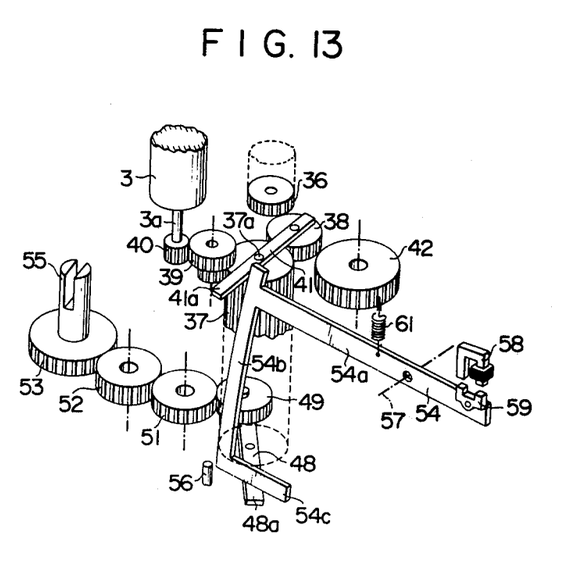
FIG. 13 is a fragmentary perspective view of the clutch mechanism shown in FIG. 12, illustrating the switching operation which takes place during a film rewind operation.

The switching member 54 is generally an L-shaped lever having an elongate limb 54a which is disposed to extend horizontally and which is pivotally mounted on a pin 57 toward its free end. The switching member also includes a limb 54b of a reduced length which extends perpendicular to the elongate limb 54a. As a result of described arrangement, the limb 54b is disposed to extend substantially vertically, and is disposed so that its upper end is aligned with the engaging piece 41a on the upper clutch plate 41 while its lower end is aligned with the engaging piece 48a on the lower clutch plate 48. However, it should be understood that when the switching member 54 is allowed to rotate clockwise about the pin 57 until the upper end of the vertical limb 54b is engageable with the engaging piece 41a, the lower end of the limb 54b retracts to a position where it is incapable of engaging with the engaging piece 48a, as shown in FIG. 13, and that when the switching member 54 rotates counter-clockwise about the pin 57 until the lower end of the vertical limb 54b is engageable with the engaging piece 48a, the upper end of the vertical limb 54b is retracted to a position where it is incapable of engaging with the engaging piece 41a, as shown in FIG. 1, thus allowing the switching member 54 to control selectively the rotation of either clutch plate 41 or 48. A return blocking limb 54c extends from the lower end of the vertical limb 54b in a direction parallel to the elongate limb 54a for abutment against the upper surface of the clutch plate 48 to prevent a returning movement of the switching member 54.

At a point nearer the vertical limb 54b than the pin 57, the switching member 54 is engaged by one end of a coiled tension spring 61, which urges the member 54 to rotate clockwise about the pin 57. However, the resulting rotation of the switching member 54 is normally limited by the fact that an armature 59 which is mounted on the free end of the elongate limb 54a is held attracted by a release electromagnet 58. When the switching member 54 assumes a rewind position shown in FIG. 13, part of the switching member 54 bears against a stop pin, not shown, thus limiting the rotation of the switching member 54 about the pin 57 under the resilience of the spring 61.

While not specifically shown, the camera incorporating the focal plane shutter of the invention is provided with perforation detecting means which detects a film winding by an amount corresponding to one frame, through the detection of a number of perforations formed in the film being fed inasmuch as a film winding of spool drive type is employed. It should be understood that the perforation detecting means may be constructed either optically or mechanically.

Figure 8B:
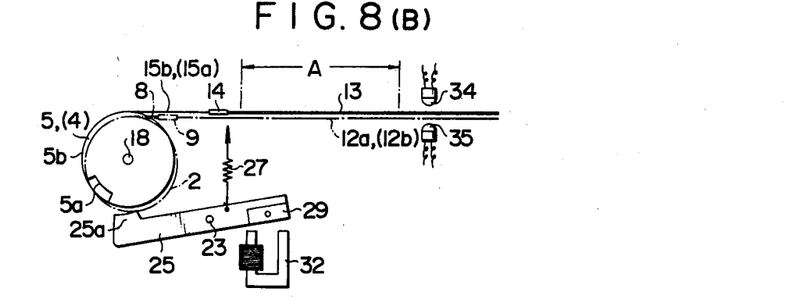

In operation, when a shutter release button, not shown, of the camera is depressed under the condition that a shutter charging operation has been completed as shown in FIG. 1, the camera assumes a condition shown in FIG. 8(A) after a movable reflecting mirror of a single lens reflex camera, not shown, has been driven upward. Specifically, the release electromagnet 32 is energized to extinguish the magnetic force which has been utilized to hold the detent lever 25 attracted thereto. Thus, the detent lever 25 which has been locking the first blind rotates counter-clockwise about the support shaft 23 under the resilience of the coiled spring 27, as indicated in FIG. 8(B). Consequently, the detent pawl 25a no longer engages the detent hole 5a, thus allowing the drum 6 to rotate in the clockwise direction under the resilience of a coiled take-up spring, not shown, which is internally housed within the drum 6 (see FIG. 1). Thus the first blind 13 begins to be taken up on the take-up drum 6. As the first blind 13 begins running, the detection hole 13a moves from its location where it is aligned with both the light emitting and the light receiving element 34, 35, whereby an output from the element 35 reduces, indicating a running condition of the first blind 13.

Figure 8C:
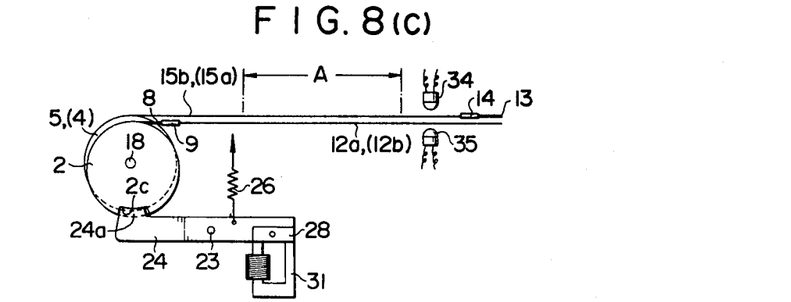
Figure 8D:
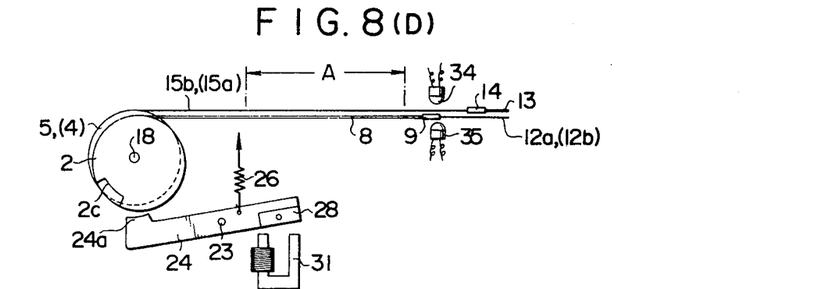

When the edge piece 14 attached to the first blind 13 moves past the location of the elements 34, 35 (see FIG. 8(C)), the output from the element 35 increases again, indicating that the running of the first blind 13 is shortly to be terminated. Upon such detection, the release electromagnet 32 is immediately deenergized in synchronized relationship therewith. This restores the attracting, magnetic force, whereby the armature 29 is held attracted to the electromagnet 32, causing the detent lever 25 to rotate clockwise about the support shaft 23 against the resilience of the coiled spring 27. Accordingly, the free end of the detent pawl 25a contacts the outer periphery of the cylindrical member 5b, which is integral with the first blind winding pulley 5 which in turn rotates as the first blind 13 runs, thus applying a braking effect upon the pulley 5 and the first blind 13 until the detent pawl 25a is completely engaged with the detent hole 5a to cease the motion of the first blind 13. If required, the emission of flashlight from an electronic flash occurs in synchronized relationship with the detection of the fact that the running of the first blind 13 is to be terminated shortly. In this manner, the combination of the elements 34, 35 serves the purpose of synchro contacts, in addition to its functioning as means to detect a shutter operation.

During the running of the first blind 13, the guide member 19 (see FIG. 2) also rotates as the first blind winding pulleys 4, 5 rotate. However, since the guide pin 21 is fitted into the guide groove 19a, the guide member 29 moves upwardly while rotating until the guide pin 21 assumes the location 21A in the groove 19a as shown in FIG. 6, without any influence upon the locking condition of the second blind 8.

After a given exposure period or when photometric means, not shown, indicates that a taking film (not shown) has been properly exposed, the release electromagnet 31 is now energized under the condition shown in FIG. 8(C), removing the attracting magnetic force of the electromagnet 31. Thereupon, the detent lever 24 associated with the second blind rotates counter-clockwise about the shaft 23 under the resilience of the coiled spring 26 as indicated in FIG. 8(D), whereby the detent pawl 24a is disengaged from the detent hole 2c. Thus the second blind take-up drum 7 rotates under the resilience of a coiled take-up spring (not shown) which is internally housed therein, thus initiating running of the second blind 8 while the drum 7 takes up the pulling strings 12a, 12b associated with the second blind.

When the edge piece 9 attached to the second blind 8 comes to a location aligned with the elements 34, 35, as shown in FIG. 8(D), during the running of the second blind 8, an output from the element 35 again reduces, indicating the fact that a running of the second blind 8 is to be terminated shortly. Upon such detection, the energization of the release electromagnet 31 is interrupted in synchronized relationship therewith. The electromagnet 31 then restores its attracting magnetic force, which holds the armature 28 attracted thereto, whereby the detent lever 24 rotates clockwise about the shaft 23 against the resilience of the coiled spring 26. This causes the free end of the detent pawl 24a to contact the outer periphery of the lower end of the second blind winding drum 2, which rotates as the second blind 8 runs, thus applying a braking effect upon the drum 2 and the second blind 8 connected thereto until the detent pawl 24a is completely engaged with the detent hole 2c to cease the motion of the second blind 8.

The rotation of the second blind winding drum 2 causes the guide pin 21 to rotate integrally, whereby the pin 21 drives the guide member 19 downward until the pin 21 is located at the position shown in solid line in FIG. 6 within the guide groove 19a.

Figure 11:
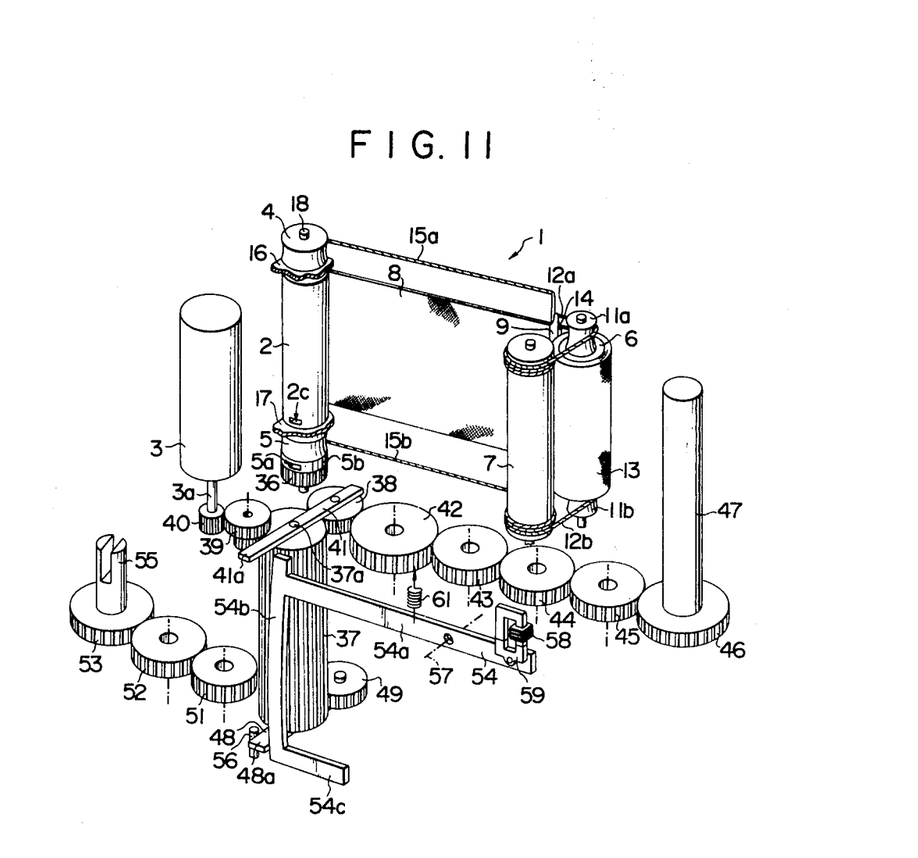
FIG. 11 is a perspective view of the triaxial focal plane shutter of FIG. 1 at the completion of its operation.

At the termination of running of the second blind 8, a major portion of the length of the first blind 13 is taken up on the first blind take-up drum 6 while a major portion of the length of the second blind 8 is pulled out of the second blind winding drum 2 and is held in taut condition between the drums 2 and 6 so as to cover the image field A (see FIG. 8), as indicated in FIG. 11.

At a given time interval which is sufficient for the second blind 8 to complete its running after the edge piece 9 attached to the second blind 8 has moved past the location aligned with the elements 34, 35, a shutter charging operation is then initiated. Specifically, as the edge piece 9 moves past the location of these elements to cause a reduction in the output from the light receiving element 35, the drive motor 3 is driven for rotation in the counter-clockwise direction at a given time interval after such reduction. At the same time as the counter-clockwise rotation of the drive motor 3 is initiated, the both release electromagnets 31, 32 are energized, whereby the detent levers 24, 25 are urged by the springs 26, 27 to rotate counter-clockwise about the support shaft 23, thus unlocking the first blind winding pulleys 4, 5 and the second blind winding drum 2.

Figure 12:
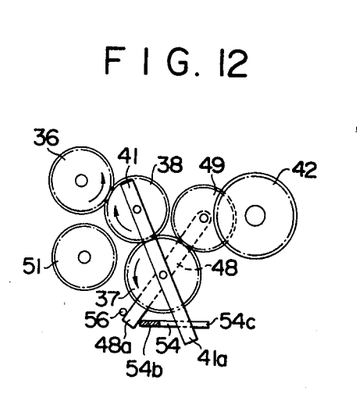
FIG. 12 is a plan view of a clutch mechanism which selectively transmits a rotating power from a drive motor to triaxial focal plane shutter of FIG. 1, illustrating the switching operation during a shutter charging operation.

As the drive motor 3 rotates counter-clockwise, the sun gear 37 is driven to rotate counter-clockwise through the reduction gear 39, whereby the planet gear 38 which has been in meshing engagement with the first stage gear 42 of the film winding gear train 42 to 46 revolves counter-clockwise around the sun gear 37 while rotating and eventually moves into meshing engagement with the shutter winding gear 36, as indicated in FIG. 12. After the planet gear 38 meshes with the winding gear 36, it can no longer revolve around the sun gear 37, and hence it transmits the rotation of the sun gear 37 or the rotation of the drive motor 3 to the winding gear 36. Accordingly, the winding gear 36 rotates counter-clockwise as do the first blind winding pulleys 4, 5 and the first blind winding shaft 18 which are integrally connected with the gear 36. The guide member 19 which is integrally coupled with the first blind winding shaft 18 in the sense of rotation also rotates counter-clockwise, whereby the guide pin 21 bears against the left-hand end of the guide groove 19a formed therein, causing the second blind winding drum 2 on which the pin 21 is fixedly mounted to rotate together in the counter-clockwise direction. In other words, the first blind winding pulleys 4, 5 and the second blind winding drum 2 are driven by the output from the drive motor 3 to rotate counter-clockwise with the same rotational speed. Accordingly, the strings 15a, 15b connected to the first blind are wrapped around the first blind winding pulleys 4, 5 while the second blind 8 is taken up on the drum 2, causing both the first and the second blind 13, 8 to be driven in a direction from the first blind take-up drum 6 toward the second blind winding drum 2, thus performing a shutter charging operation. As the first blind 13 and the pulling strings 12a, 12b connected to the second blind are reeled off, both the first blind take-up drum 6 and the second blind take-up drum 7 rotate counter-clockwise, charging the coiled take-up springs (not shown) which are internally housed within the drums 6, 7, respectively.

When the first blind 13 moves to a point where the detection hole 13a is aligned with the elements 34, 35, the light from the element 34 impinges upon the light receiving element 35 through the detection hole 13a, thus increasing an output from the element 35 to indicate the completion of a shutter charging operation. Accordingly, the energization of the release electromagnets 31, 32 is interrupted, allowing the detent pawls 24a, 25a on the detent levers 24, 25 to engage the respective detent holes 2c, 5a, thus locking the first blind 13 and the second blind 8 at their wound-up positions. At this time, the shutter has returned to its charged condition illustrated in FIG. 1.

When the completion of a shutter charging operation is detected as a result of the movement of the detection hole 13a formed in the first blind 13 to the location aligned with the elements 34, 35, the energization of the drive motor 3 is immediately reversed. Consequently, the sun gear 37 now begins to rotate the clockwise, causing the planet gear 38 which has been meshing with the shutter winding gear 36 to be disengaged and to move away therefrom to revolve clockwise around the sun gear 37 while rotating. Subsequently, the planet gear 38 meshes with the gear 42 in the film winding gear train 42 to 46, as shown in FIG. 1, whereupon its further revolution is blocked and the rotation of the sun gear or the output from the drive motor 3 is transmitted to the gear 42. As a result, the film winding gear train 42 to 46 operates to rotate the film winding spool shaft 47 clockwise, and a perforated roll film (not shown) which has its leader wrapped around the spool shaft 47 is reeled off a magazine (not shown) which is mounted on the film rewind shaft 55, thus allowing a length of the film corresponding to one exposed frame to be taken up on the spool shaft 47. A film winding operation for one frame is detected by perforation detecting means (not shown) which detects the number of perforations in the film being fed. Specifically, for a usual 35 mm camera, the passage of eight perforations represent the completion of a film winding corresponding to one frame. When the film has been wound up through a distance corresponding to one exposed frame, the drive motor 3 is deenergized and therefore ceases to rotate. Therefore, the motor driven camera is temporarily in its standby mode with the shutter charged as shown in FIG. 1 and the film wound up.

If the remaining unexposed film length is less than one frame as a result of the film winding operation, a film rewind operation takes place in the course of the film winding operation. Specifically, in the event perforation detecting means fails to detect a next following perforation for a given time interval, which may be two seconds, for example, before the number of perforations detected during a film winding operation reaches eight, it is concluded that the film is not being fed or the unexposed film has a length less than one frame and no more film length can be reeled off, whereby the camera automatically enters a film rewind mode.

During such operation, the release electromagnet 58 is initially energized, thus removing the attracting magnetic force. Thereupon, the switching member 54 moves clockwise about the pin 57 under the resilience of the coiled spring 61 as shown in FIG. 13, whereby the lower end of the vertical limb 54b retracts out of a position where it constrains the rotation of the clutch plate 48 while the upper end of the vertical limb 54b moves into a position where it constrains the rotation of the clutch plate 41. At the same time, the drive motor 3 is reversed so as to rotate counter-clockwise. This drives the sun gear 37 to rotate counter-clockwise, whereby the planet gear 38 moves away from the first stage gear 42 of the film winding gear train 42 to 46 and revolves counter-clockwise about the sun gear while rotating. However, the engaging piece 41a on the clutch plate 41 which bears against the upper end of the vertical limb 54b prevents a further revolution, whereby it remains and idles at a nonmeshing position intermediate the shutter winding gear 36 and the first stage gear 42.

On the other hand, since the lower end of the vertical limb 54b of the switching member 54 has retracted from its position where it is engageable with the engaging piece 48a on the clutch plate 48, the rotation of the sun gear 37 causes the lower planet gear 49 to revolve counter-clockwise about the sun gear while rotating, and to move into meshing engagement with the first stage gear 51 of the film rewind gear train 51 to 53. As the planet gear meshes with the gear 51, its further revolution is prevented, whereby it transmits the rotation of the sun gear 37 or the output from the drive motor 3 to the gear 51. In this manner, the film rewind gear train 51 to 53 causes the film rewind shaft 55 to rotate counter-clockwise, whereby a magazine (not shown) which is mounted on the shaft 55 rewinds the film.

The energization of the electromagnet 58 is once interrupted after the planet gear 49 has meshed with the first stage gear 51. This restores the attracting magnetic force of the electromagnet 58, but the return blocking piece 54c bears against the upper surface of the clutch plate 48 to prevent a returning movement of the switching member 54, thus maintaining the upper planet gear 38 in its non-meshing position while maintaining the meshing condition of the lower planet gear 49.

As the film is entirely rewound into the magazine, the perforation detecting means regards the absence of the film as the presence of perforations. When such condition continues over a given time interval, for example, two seconds, it is recognized as indicating the completion of a film rewind operation and the rotation of the drive motor 3 is stopped. Thus, the camera has terminated a film rewind operation and remains quiescent.

A returning movement of the switching member 54 to its non-rewind position shown in FIG. 1 occurs when a fresh film magazine is loaded into the camera and an initial film winding operation takes place for purpose of film loading. Specifically, when the drive motor 3 rotates clockwise in order to achieve a film winding operation, the upper planet gear 38 revolves clockwise to move into meshing engagement with the gear 42, thus winding up the film. Simultaneously, the lower planet gear 49 revolves clockwise, whereby the clutch plate 48 retracts from its position where it bears against the return blocking piece 54c of the switching member 54, so that the switching member 54 can be returned to its non-rewind position under the attracting magnetic force of the release electromagnet 58 which attracts the armature 59.

What is claimed is:

1. A triaxial focal plane shutter including:
a first take-up drum for a first shutter blind;
a second take-up drum for a second shutter blind;
a first blind winding shaft;
a second blind winding drum;
a pair of first blind winding pulleys, said second blind winding drum being rotatably supported by a pair of support members disposed above and below it; said first blind winding pulleys being mounted on an upper and a lower end of said first blind winding shaft which extends through both said second blind winding drum and said pair of support members to points above and below said support members such that said first blind winding pulleys are rotatable independently of said second blind winding drum.

2. A triaxial focal plane shutter according to claim 1 in which said first blind winding pulleys have a center of rotation defined by said first blind winding shaft, said shaft being disposed eccentrically with respect to the center of rotation of said second blind winding drum.

3. A triaxial focal plane shutter according to claim 1 in which said second blind winding drum has an upper and a lower end face, both of which are centrally formed with bearing openings, into which are fitted bearing dowels formed on said pair of support members, whereby said second blind winding drum is rotatably disposed, said first blind winding shaft extending through said dowels and said bearing openings.

4. A triaxial focal plane shutter according to claim 1 in which the lower one of said first blind winding pulleys is formed with a detent hole and is also integrally formed with a shutter charging gear, said detent hole serving to stop said pulley at a wound-up position.

5. A triaxial focal plane shutter according to claim 1 in which said second blind winding drum internally houses a coupling mechanism which causes said second blind winding drum and said first blind winding shaft to rotate integrally during a shutter charging operation and which permits relative rotation between said second blind winding drum and said first blind winding shaft during a shutter release operation.

6. A triaxial focal plane shutter according to claim 5 in which said coupling mechanism comprises a guide pin formed on said second blind winding drum so as to extend radially inward, and a guide member disposed on said first blind winding shaft and being peripherally formed with a helical guide groove into which said guide pin is fitted, said guide member being movable axially of said first blind winding shaft and being connected for integral rotation with said first blind winding shaft.

7. A triaxial focal plane shutter according to claim 6 in which said guide member has a central opening extending therethrough, through which said first blind winding shaft extends, said guide member being formed with an anti-rotation slit into which an anti-rotation pin fixedly mounted on said first blind winding shaft and extending in a direction perpendicular to the axis thereof is fitted.

* * * * *